US011215110B2

(12) United States Patent
Thomassin et al.

(10) Patent No.: US 11,215,110 B2
(45) Date of Patent: Jan. 4, 2022

(54) ROTARY ENGINE AND METHOD OF COMBUSTING FUEL

(71) Applicant: PRATT & WHITNEY CANADA CORP., Longueuil (CA)

(72) Inventors: Jean Thomassin, Sainte-Julie (CA); Andre Julien, Sainte-Julie (CA); Serge Dussault, Sainte-Julie (CA)

(73) Assignee: PRATT & WHITNEY CANADA CORP., Longueuil (CA)

(*) Notice: Subject to any disclaimer, the term of this patent is extended or adjusted under 35 U.S.C. 154(b) by 0 days.

(21) Appl. No.: 16/177,752

(22) Filed: Nov. 1, 2018

(65) Prior Publication Data

US 2019/0107042 A1 Apr. 11, 2019

Related U.S. Application Data

(62) Division of application No. 15/729,043, filed on Oct. 10, 2017, now Pat. No. 10,145,291.

(51) Int. Cl.
*F02B 19/10* (2006.01)
*F02B 53/10* (2006.01)
(Continued)

(52) U.S. Cl.
CPC ............ *F02B 19/1023* (2013.01); *F02B 9/08* (2013.01); *F02B 19/1014* (2013.01);
(Continued)

(58) Field of Classification Search
CPC .............. F02B 19/1014; F02B 19/1023; F02B 19/108; F02B 19/14; F02B 2053/005;
(Continued)

(56) References Cited

U.S. PATENT DOCUMENTS 1,539,133 A 5/1925 Markle et al.
2,093,339 A 9/1937 Pipping
(Continued)

FOREIGN PATENT DOCUMENTS

CN 102691564 9/2012
DE 1926474 1/1970
(Continued)

OTHER PUBLICATIONS

Barney Gaylord, Finding Top Dead Center (TDC) Casually—CS-111 A, The MGA with an Attitude, 2012, pp. 1/2. Aug. 4, 2017.
(Continued)

*Primary Examiner* — George C Jin
(74) *Attorney, Agent, or Firm* — Norton Rose Fulbright Canada LLP

(57) ABSTRACT

A method of combusting fuel, e.g. heavy fuel, in a rotary engine, including injecting a main quantity of fuel directly into a combustion chamber to form a first fuel-air mixture having a first air-fuel equivalence ratio λ higher than 1, injecting a pilot quantity of fuel into a pilot subchamber to form a second fuel-air mixture having a second air-fuel equivalence ratio λ smaller than the first air-fuel equivalence ratio, igniting the second fuel-air mixture within the pilot subchamber, using the ignited second fuel-air mixture from the pilot subchamber to ignite the first fuel-air mixture, and injecting a supplemental quantity of fuel directly into the combustion chamber after igniting the first fuel-air mixture, upstream of an exhaust port of the rotary engine with respect to a direction of rotation of the rotor. A rotary engine with interburner fuel injector is also discussed.

19 Claims, 4 Drawing Sheets

(51) Int. Cl.
*F02D 41/30* (2006.01)
*F02B 9/08* (2006.01)
*F02B 53/00* (2006.01)

(52) U.S. Cl.
CPC .......... *F02B 53/10* (2013.01); *F02D 41/3094* (2013.01); *F02B 2053/005* (2013.01)

(58) Field of Classification Search
CPC ........ F02B 57/002; F02B 57/04; F02B 57/00; F02B 53/10; F02B 53/06; F02B 53/02; F02B 53/04; F02B 29/08; F02D 41/3094; F02D 41/402; F02D 41/403; F02C 20/16
See application file for complete search history.

(56) References Cited

U.S. PATENT DOCUMENTS

| | | |
|---|---|---|
| 2,739,578 A | 3/1956 | Stump |
| 2,932,289 A | 4/1960 | Witzky |
| 2,935,054 A | 5/1960 | Franke et al. |
| 3,044,454 A | 7/1962 | Leslie |
| 3,058,452 A | 10/1962 | Espenschied |
| 3,102,521 A | 9/1963 | Slemmons |
| 3,126,876 A | 3/1964 | Lucas |
| 3,246,636 A | 4/1966 | Bentele |
| 3,391,677 A | 7/1968 | Héjj |
| 3,508,530 A | 4/1970 | Clawson |
| 3,512,907 A | 5/1970 | Belzner |
| 3,722,480 A | 3/1973 | Berkowitz |
| 3,736,080 A | 5/1973 | Sabet |
| 3,779,215 A | 12/1973 | Sabet |
| 3,857,369 A | 12/1974 | Sabet |
| 3,861,361 A | 1/1975 | Klomp et al. |
| 3,894,518 A | 7/1975 | Gavrun et al. |
| 3,910,238 A | 10/1975 | James |
| 3,941,097 A | 3/1976 | Seufer et al. |
| 3,954,088 A | 5/1976 | Scott |
| 3,957,021 A | 5/1976 | Loyd, Jr. |
| 3,960,115 A | 6/1976 | Lamping et al. |
| 3,976,036 A * | 8/1976 | Muroki ................ F02B 53/10 123/209 |
| 3,987,759 A | 10/1976 | Roberts et al. |
| 4,006,720 A | 2/1977 | Sato |
| 4,009,688 A | 3/1977 | Hayashida et al. |
| 4,029,058 A | 6/1977 | Jones |
| 4,055,154 A | 10/1977 | Kono |
| 4,057,036 A | 11/1977 | Gibson |
| 4,060,058 A | 11/1977 | Hideg et al. |
| 4,066,044 A | 1/1978 | Jones et al. |
| 4,074,956 A | 2/1978 | Maruyama et al. |
| 4,077,366 A | 3/1978 | Hideg et al. |
| 4,080,934 A | 3/1978 | Jones |
| 4,083,329 A | 4/1978 | Myers |
| 4,085,712 A | 4/1978 | Myers et al. |
| 4,089,306 A | 5/1978 | Goloff |
| 4,091,789 A | 5/1978 | Jones |
| 4,096,828 A | 6/1978 | Satou et al. |
| 4,108,136 A | 8/1978 | Hideg et al. |
| 4,186,692 A | 2/1980 | Kawamura et al. |
| 4,239,023 A | 12/1980 | Simko |
| 4,259,932 A | 4/1981 | Hideg et al. |
| 4,270,499 A | 6/1981 | Frelund |
| 4,323,039 A | 4/1982 | Tsungekawa et al. |
| 4,483,290 A | 11/1984 | Hass |
| 4,541,375 A | 9/1985 | Tanaka |
| 4,577,600 A | 3/1986 | Morita et al. |
| 4,616,611 A | 10/1986 | Ogawa et al. |
| 4,619,229 A | 10/1986 | Imoto |
| 4,635,598 A | 1/1987 | Tanaka |
| 4,651,692 A | 3/1987 | Morita et al. |
| 4,662,330 A | 5/1987 | Shioyama |
| 4,662,331 A | 5/1987 | Ogawa et al. |
| 4,672,933 A | 6/1987 | Taniguchi et al. |
| 4,676,207 A | 6/1987 | Kawamura et al. |
| 4,676,209 A | 6/1987 | Etoh |
| 4,681,074 A | 7/1987 | Ogawa et al. |
| 4,699,102 A | 10/1987 | Taniguchi |
| 4,714,062 A | 12/1987 | Toeda |
| 4,759,325 A | 7/1988 | Jones |
| 4,873,952 A | 10/1989 | Narita et al. |
| 4,875,444 A | 10/1989 | Tsuchida et al. |
| 4,884,538 A | 12/1989 | Tanaka |
| 4,899,707 A | 2/1990 | Matsuura |
| 4,926,817 A | 5/1990 | Imoto et al. |
| 4,962,736 A | 10/1990 | Matsuo et al. |
| 5,014,662 A | 5/1991 | Trapy |
| 5,022,366 A | 6/1991 | Abraham et al. |
| 5,024,193 A | 6/1991 | Graze |
| 5,065,714 A | 11/1991 | Matsuoka |
| 5,109,817 A | 5/1992 | Cherry |
| 5,168,846 A * | 12/1992 | Paul ...................... F01C 20/16 123/202 |
| 5,178,104 A | 1/1993 | Ito et al. |
| 5,335,061 A | 8/1994 | Yamamoto et al. |
| 5,520,864 A | 5/1996 | Frei |
| 5,522,356 A | 6/1996 | Palmer |
| 5,524,587 A | 6/1996 | Mallen et al. |
| 5,540,056 A | 7/1996 | Heberling et al. |
| 5,678,524 A | 10/1997 | Ofner et al. |
| 5,709,189 A | 1/1998 | Monnier |
| 5,720,251 A | 2/1998 | Round et al. |
| 5,979,395 A | 11/1999 | Mallen et al. |
| 6,062,188 A | 5/2000 | Okamura |
| 6,125,813 A | 10/2000 | Louthan et al. |
| 6,162,034 A | 12/2000 | Mallen |
| 6,244,240 B1 | 6/2001 | Mallen |
| 6,321,713 B1 | 11/2001 | Mallen |
| 6,435,851 B2 | 8/2002 | Mallen |
| 6,694,944 B2 | 2/2004 | Agama et al. |
| 6,860,251 B1 | 3/2005 | Reed |
| 6,892,692 B2 | 5/2005 | Barrett |
| 7,370,626 B2 | 5/2008 | Schubert |
| 7,753,036 B2 | 7/2010 | Lents et al. |
| 7,775,044 B2 | 8/2010 | Julien et al. |
| 7,832,372 B2 | 11/2010 | Blank |
| 7,950,364 B2 | 5/2011 | Nerheim |
| 8,033,264 B2 | 10/2011 | Lauter |
| 8,839,761 B2 | 9/2014 | Minick et al. |
| 9,038,594 B2 | 5/2015 | Thomassin et al. |
| 9,057,321 B2 | 6/2015 | Reitz et al. |
| 9,121,277 B2 | 9/2015 | Gekht et al. |
| 9,200,563 B2 | 12/2015 | Thomassin |
| 9,217,360 B2 | 12/2015 | Pierz |
| 9,334,794 B2 | 5/2016 | Gaul et al. |
| 9,353,680 B2 | 5/2016 | Villeneuve et al. |
| 9,399,947 B2 | 7/2016 | Schulz et al. |
| 9,528,434 B1 | 12/2016 | Thomassin et al. |
| 9,638,093 B2 | 5/2017 | Blank |
| 9,664,047 B2 | 5/2017 | McDaniel et al. |
| 2008/0017165 A1 | 1/2008 | Schubert |
| 2008/0148731 A1 | 6/2008 | Cao |
| 2009/0309475 A1 | 12/2009 | Tozzi |
| 2012/0227397 A1 | 9/2012 | Willi et al. |
| 2013/0025567 A1 | 1/2013 | Thomassin |
| 2013/0160734 A1 | 6/2013 | Redtenbacher et al. |
| 2013/0186366 A1 | 7/2013 | Reitz et al. |
| 2013/0321612 A1 | 12/2013 | Bousquet et al. |
| 2014/0251258 A1 | 9/2014 | Thomassin et al. |
| 2014/0261293 A1* | 9/2014 | Schulz .................. F02B 19/108 123/209 |
| 2015/0275749 A1 | 10/2015 | Thomassin |
| 2015/0275756 A1 | 10/2015 | Bolduc et al. |
| 2016/0053667 A1 | 2/2016 | Loetz et al. |
| 2016/0252010 A1 | 9/2016 | Villeneuve et al. |
| 2017/0328274 A1 | 11/2017 | Schulz et al. |

FOREIGN PATENT DOCUMENTS

| | | |
|---|---|---|
| DE | 10121036 | 11/2002 |
| DE | 102011083143 | 3/2013 |
| EP | 2497902 | 9/2012 |
| EP | 2551448 | 1/2013 |
| EP | 2778367 | 9/2014 |
| FR | 2185759 | 1/1974 |

(56) References Cited

FOREIGN PATENT DOCUMENTS

| | | |
|---|---|---|
| GB | 1193878 | 6/1970 |
| JP | 49-12220 | 2/1974 |
| JP | 58-162721 | 9/1983 |
| JP | 59-007726 | 1/1984 |
| JP | 59-046317 | 3/1984 |
| JP | 59017252 | 4/1984 |
| JP | 6093124 | 5/1985 |
| JP | 61-083451 | 4/1986 |
| JP | 61-093227 | 5/1986 |
| JP | 61-123714 | 6/1986 |
| JP | 62-010418 | 1/1987 |
| JP | 528345 | 2/1987 |
| JP | 63179134 | 7/1988 |
| JP | 63179136 | 7/1988 |
| JP | S63159614 | 7/1988 |
| JP | S6480722 | 3/1989 |
| JP | 01-151722 | 6/1989 |
| JP | 3003940 | 1/1991 |
| JP | 3199627 | 8/1991 |
| JP | 04-140418 | 5/1992 |
| JP | 4-298641 | 10/1992 |
| JP | 6221176 | 8/1994 |
| JP | 3210027 | 7/2001 |
| JP | 3233138 | 9/2001 |
| JP | 4031630 | 10/2007 |
| JP | 2011-122598 | 6/2011 |
| RU | 2387851 | 12/2009 |
| SK | 6949 | 6/2014 |
| WO | 9857037 | 12/1998 |
| WO | 2008043154 | 4/2008 |
| WO | 2011092365 | 8/2011 |

OTHER PUBLICATIONS

NASA Contractor Report 189106, vol. 1, Stratified Charge Rotary Engine Critical Technology Enablement, vol. 1, 1992, pp. 1 to 94, C.E. Iron and R.E. Mount, Wood-Ridge, New Jersey.
Rotary Engine by Kenichi Yamamoto, 1981.
European Search report received in corresponding European application No. 18199360.1.

* cited by examiner

ROTARY ENGINE AND METHOD OF COMBUSTING FUEL

RELATED APPLICATION

This application is a divisional of U.S. patent application Ser. No. 15/729,043 filed on Oct. 10, 2017, the content of which is hereby incorporated by reference.

TECHNICAL FIELD

This application relates generally to rotary internal combustion engines, more particularly to the combustion in such engines.

BACKGROUND OF THE ART

Rotary engines burning gasoline are generally inefficient under lean conditions; spark ignition typically requires a homogeneous mixture of fuel and air near stoichiometric conditions in order to have sufficient combustion stability. Typically the fuel and air are premixed before being injected into the combustion chambers.

It is also known to use rotary engines with heavy fuel. A pilot subchamber can be used for pilot injection, which may allow for a lean fuel and air mixture to be used in the combustion chambers. The power output of such engines can however be limited by the maximum peak pressure allowable for the particular engine configuration.

SUMMARY

In one aspect, there is provided a method of combusting fuel in a rotary engine, the method comprising: injecting a main quantity of the fuel directly into a combustion chamber of the rotary engine to form a first fuel-air mixture within the combustion chamber, the first fuel-air mixture having a first air-fuel equivalence ratio $\lambda$ higher than 1; injecting a pilot quantity of the fuel into a pilot subchamber to form a second fuel-air mixture within the pilot subchamber, the second fuel-air mixture having a second air-fuel equivalence ratio $\lambda$ smaller than the first air-fuel equivalence ratio; igniting the second fuel-air mixture within the pilot subchamber; using the ignited second fuel-air mixture from the pilot subchamber to ignite the first fuel-air mixture; and after igniting the first fuel-air mixture, injecting a supplemental quantity of the fuel directly into the combustion chamber, the supplemental quantity being injected upstream of an exhaust port of the rotary engine with respect to a direction of rotation of the rotor.

In another aspect, there is provided a rotary engine comprising: a rotor sealingly received within an internal cavity of a housing to define a plurality of combustion chambers having a variable volume; an intake port and an exhaust port defined through the housing and in fluid communication with each of the combustion chambers in a successive manner; a pilot subchamber in fluid communication with each of the combustion chambers in a successive manner; a main fuel injector in direct fluid communication with each of the combustion chambers in a successive manner, the main fuel injector being located downstream of the intake port and upstream of the pilot subchamber with respect to a direction of rotation of the rotor; a pilot fuel injector in fluid communication with the pilot subchamber; an ignition source in heat exchange relationship with the pilot subchamber; and an interburner fuel injector in direct fluid communication with each of the combustion chambers in a successive manner, the interburner fuel injector being located downstream of the pilot subchamber and upstream of the exhaust port.

In another aspect, there is provided a compound engine assembly including the rotary engine, a compressor in fluid communication with the intake port of the rotary engine, and a turbine in fluid communication with the exhaust port of the rotary engine, the turbine having a turbine shaft compounded with an engine shaft drivingly engaged to the rotor.

DESCRIPTION OF THE DRAWINGS

Reference is now made to the accompanying figures in which.

DETAILED DESCRIPTION

Figure 1:
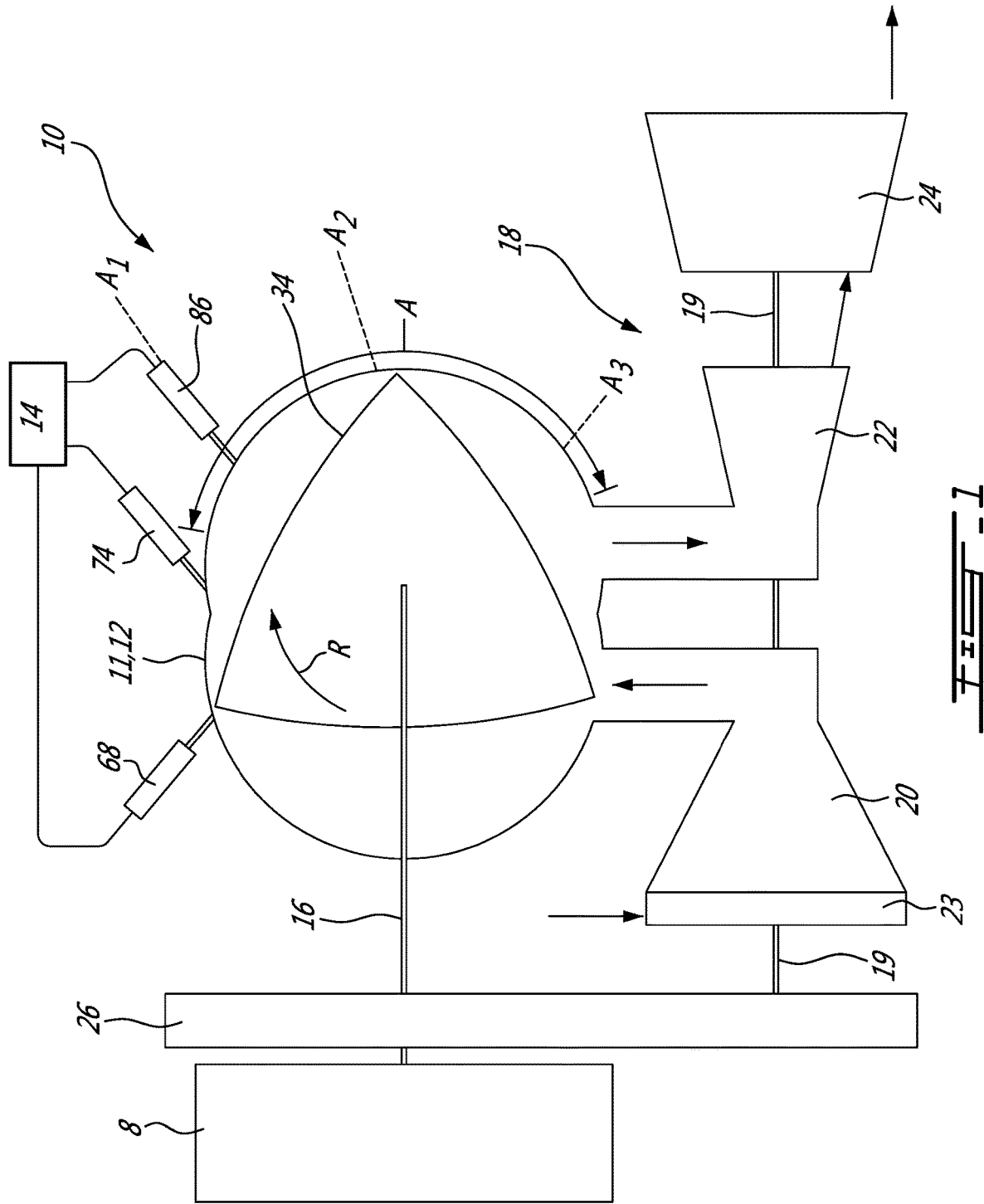
FIG. 1 is a schematic cross-sectional view of an engine assembly in accordance with a particular embodiment.

FIG. 1 illustrates a compound engine assembly 10 in accordance with a particular embodiment, which may be configured for example as a turboprop engine, a turboshaft engine, a turbofan engine, or an auxiliary power unit (APU). The engine assembly 10 generally includes a compressor 20, an intermittent internal combustion engine 12 configured for example as a liquid cooled heavy fueled multi-rotor rotary intermittent combustion engine, and a turbine section 18 including one or more turbines.

The outlet of the compressor 20 is in fluid communication with the inlet of the engine 12; although not shown, such communication may be performed through an intercooler so as to reduce the temperature of the compressed air prior to the compressed air entering the engine 12. In the embodiment shown, the compressor 20 includes variable inlet guide vanes 23 through which the air flows before reaching the rotor(s) of the compressor 20. The compressor 20 may be a single-stage device or a multiple-stage device and may include one or more rotors having radial, axial or mixed flow blades.

A source of fuel 14 is in fluid communication with fuel injectors 68, 74, 86 (further described below) of the engine 12. In a particular embodiment, the source of fuel 14 is a source of heavy fuel e.g. diesel, kerosene, jet fuel, equivalent biofuel; other suitable types of fuel may alternately be used, including, but not limited to, "light fuel" such as gasoline and naphta. In the engine 12 the compressed air is mixed with the fuel and combusted to provide power and a residual quantity of exhaust gas. The engine 12 drives an engine shaft 16, and provides an exhaust flow in the form of exhaust pulses of high pressure hot gas exiting at high peak velocity. The outlet of the engine 12 is in fluid communication with the inlet of the turbine section 18, and accordingly the exhaust flow from the engine 12 is supplied to the turbine(s) of the turbine section 18.

The turbine section 18 includes at least one turbine rotor engaged on a turbine shaft 19. In a particular embodiment, the turbine section 18 includes a first stage turbine 22 receiving the exhaust from the engine 12, and a second stage turbine 24 receiving the exhaust from the first stage turbine 22; each turbine 22, 24 may be a single-stage device or a multiple-stage device and may include one or more rotors having radial, axial or mixed flow blades. In a particular embodiment, the turbines 22, 24 have different reaction ratios from one another. In a particular embodiment, the first stage turbine 22 is configured to take benefit of the kinetic energy of the pulsating flow exiting the engine 12 while stabilizing the flow and the second stage turbine 24 is configured to extract energy from the remaining pressure in the flow. Accordingly, in a particular embodiment the reaction ratio of the first stage turbine 22 is lower than the reaction ratio of the second stage turbine 24. Other configurations are also possible.

Power from the engine 12 and turbines 22, 24 is compounded to drive a rotatable load 8, for example via a gearbox 26 defining a driving engagement between the engine shaft 16, the turbine shaft 19 and the rotatable load 8. The rotatable load 8 may be any suitable type of load including, but not limited to, one or more generator(s), propeller(s), helicopter rotor mast(s), fan(s), compressor(s), or any other appropriate type of load or combination thereof. It is understood that the power from the engine shaft 16 and turbine shaft 19 may be compounded using any other suitable type of engagement, including, but not limited to, by having each shaft engaged to a respective electrical motor/generator with power being transferable between the electrical motor/generators (electrical compounding).

In the embodiment shown, the compressor 20 is driven by the turbine section 18, by having the rotor(s) of the compressor 20 directly engaged to the turbine shaft 19. Alternately, the rotor(s) of the compressor 20 may be connected to a separate shaft driven by the turbine shaft 19 and/or the engine shaft 16, for example via the gearbox 26 or via a separate gearbox.

It is understood that the engine assembly 10 shown is provided as an example only, and that the engine assembly 10 may have any other suitable configuration, including, but not limited to, the configuration of the compound cycle engine system or compound cycle engine such as described in Lents et al.'s U.S. Pat. No. 7,753,036 issued Jul. 13, 2010, or such as described in Julien et al.'s U.S. Pat. No. 7,775,044 issued Aug. 17, 2010, or such as described in Thomassin et al.'s U.S. patent publication No. 2015/0275749 published Oct. 1, 2015, or such as described in Bolduc et al.'s U.S. patent publication No. 2015/0275756 published Oct. 1, 2015, the entire contents of all of which are incorporated by reference herein. For example, the compound engine assembly 10 may be configured as a single shaft engine assembly. The compound engine assembly 10 may be used as a prime mover engine, such as on an aircraft or other vehicle, or in any other suitable application.

Moreover, it is understood that the engine assembly 10 may have other configurations than that of a compound engine assembly. For example, the turbine section 18 may be omitted, or may rotate independently of the internal combustion engine 12. The compressor 20 may be omitted. For example, the internal combustion engine 12 may have its inlet and outlet in direct communication with ambient air, i.e. be used without being fluidly connected to a compressor and a turbine.

In the embodiment shown, the engine 12 is a rotary intermittent internal combustion engine including two or more rotor assemblies 11 drivingly engaged to the engine shaft 16. In another embodiment, the engine 12 includes a single rotor assembly 11. In a particular embodiment, the rotor assembly(ies) are configured as Wankel engines.

Figure 2:
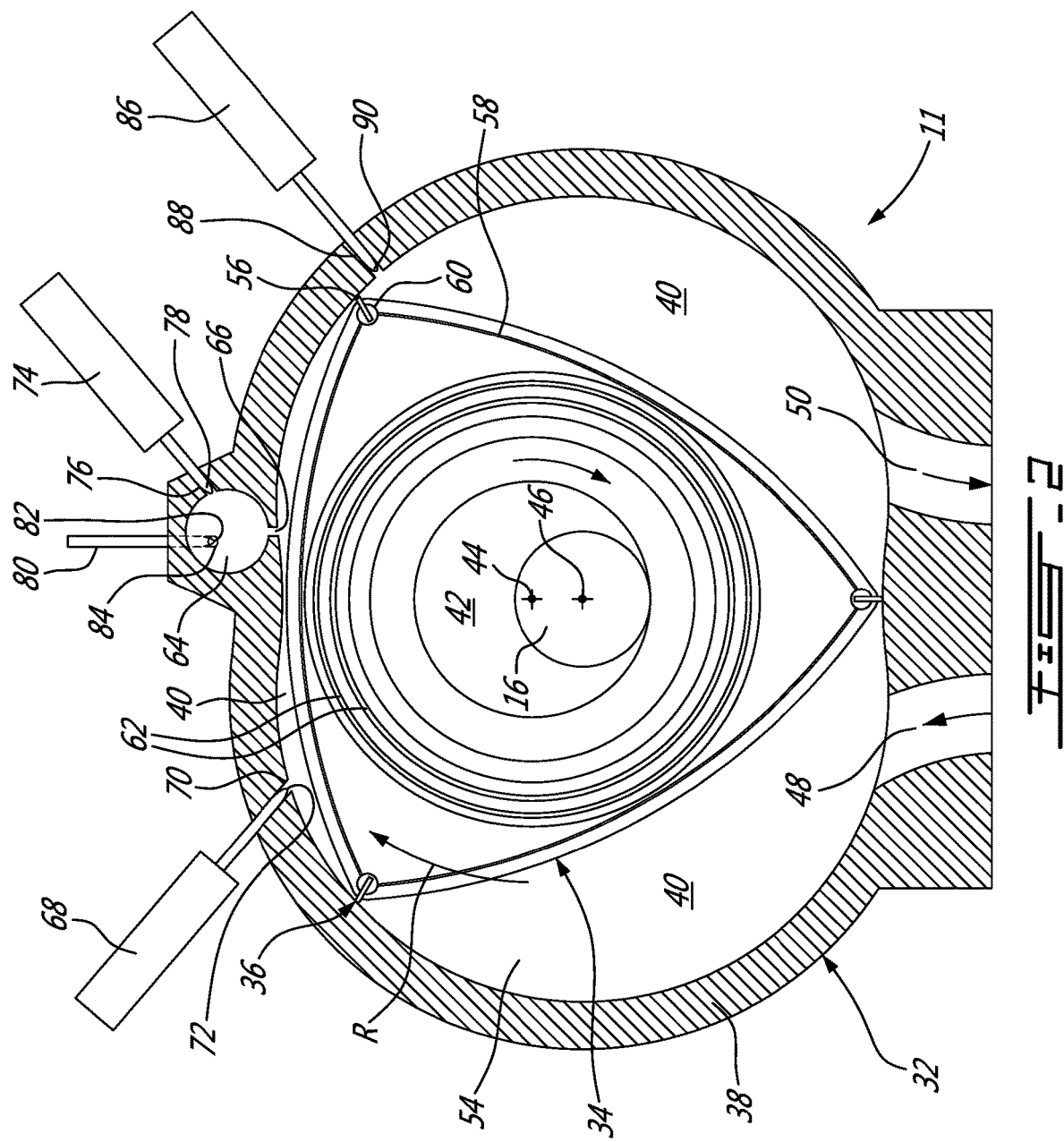
FIG. 2 is a schematic cross-sectional view of a rotary engine which may be used in the engine assembly of FIG. 1, in accordance with a particular embodiment.

Referring to FIG. 2, an example of a Wankel engine which may define a rotor assembly 11 of the engine 12 is shown. It is understood that the configuration of the rotor assembly 11, e.g. placement of ports, number and placement of seals, number of apex portions, combustion chambers, etc., may vary from that of the embodiment shown.

The rotor assembly 11 comprises a housing 32 defining an internal cavity having a profile defining two lobes, which is preferably an epitrochoid. A rotor 34 is received within the internal cavity. The rotor 34 in this embodiment defines three circumferentially-spaced apex portions 36, and a generally triangular profile with outwardly arched sides. The apex portions 36 are in sealing engagement with the inner surface of a peripheral wall 38 of the housing 32 to form and separate three combustion chambers 40 of variable volume between the rotor 34 and the housing 32. The peripheral wall 38 extends between two axially spaced apart end walls 54 to surround the internal cavity.

The rotor 34 is in driving engagement with the engine shaft 16, by being engaged to an eccentric portion 42 of the engine shaft 16 to perform orbital revolutions within the internal cavity. The engine shaft 16 performs three rotations for each orbital revolution of the rotor 34. The geometrical axis 44 of the rotor 34 (and of the eccentric portion 42) is offset from and parallel to the central axis 46 of the housing 32 (and of the shaft 16). During each revolution of the rotor 34, each combustion chamber 40 varies in volume and moves around the internal cavity to undergo the four phases of intake, compression, expansion and exhaust.

For efficient operation the combustion chambers 40 are sealed by spring-loaded peripheral or apex seals 56 extending from the rotor 34 to engage the inner surface of the peripheral wall 38, and spring-loaded face or gas seals 58 and end or corner seals 60 extending from the rotor 34 to engage the inner surface of the end walls 54. The rotor 34 also includes at least one spring-loaded oil seal ring 62 biased against the inner surface of the end wall 54 around the bearing for the rotor 34 on the shaft eccentric portion 42.

An intake port 48 is defined through the housing 32, for example through the peripheral wall 38. The intake port 48 is in fluid communication with each of the combustion chambers 40 in a successive manner, for admitting air (in the embodiment of FIG. 1, compressed air from the compressor 20) into each of the combustion chambers 40 one after the other. The intake port(s) 48 of the rotor assembly(ies) 11 together define the inlet of the engine 12. An exhaust port 50 is also provided through the housing 32, for example through the peripheral wall 38. The exhaust port 50 is in fluid communication with each of the combustion chambers 40 in a successive manner, for discharge of the exhaust gases from each of the combustion chambers 40 one after the other (which in the embodiment of FIG. 1 is then circulated to the turbine section 18). The exhaust port(s) 50 of the rotor assembly(ies) 11 together define the exhaust of the engine 12. Alternately, the intake port 48 and the exhaust port 50 may be provided through the end or side wall 54 of the housing 32.

The effective volumetric expansion ratio of a combustion chamber 40 can be defined as the ratio between the maximum working volume during the portion of the expansion phase where the combustion chamber 40 does not communicate with the exhaust port 50, and the minimum working volume during the expansion phase. The effective volumetric compression ratio of a combustion chamber 40 can be defined as the ratio between the maximum working volume during the portion of the compression phase where the combustion chamber 40 does not communicate with the intake port 48, and the minimum working volume during the compression phase. In a particular embodiment, the combustion chambers 40 all have the same effective volumetric compression ratio, which is considered to be the effective volumetric compression ratio of the engine 12, and the combustion chambers 40 all have the same effective volumetric expansion ratio, which is considered to be the effective volumetric expansion ratio of the engine 12. In a particular embodiment, the engine 12 operates under the Miller cycle, i.e., with a lower effective volumetric compression ratio than its effective volumetric expansion ratio. This may be obtained, for example, by positioning the intake port 48 to be closer to top dead center (TDC) than the exhaust port 50 to reduce the effective volumetric compression ratio. Alternately, the effective volumetric compression and expansion ratios of the engine 12 may be similar or equal to each other.

The rotor assembly 11 includes a pilot subchamber 64 in fluid communication with the internal cavity of the housing 32, so as to be in fluid communication with each of the combustion chambers 40 in a successive manner. In the embodiment shown, the pilot subchamber 64 has a circular cross-section; alternate shapes are also possible. The pilot subchamber 64 communicates with the internal cavity through at least one opening 66 defined through the peripheral wall 38 (as shown) or through the end wall 54. The pilot subchamber 64 has a shape forming a reduced cross-section adjacent the opening(s), such that the opening(s) 66 define(s) a restriction to the flow between the pilot subchamber 64 and the internal cavity. The opening(s) 66 may have any suitable shape and configuration.

The pilot subchamber 64 may be defined in an insert made of a material having a greater heat resistance than that of the peripheral wall 38 and end wall 54; in a particular embodiment, the peripheral wall 38 and end wall 54 are made of aluminium. Non-limiting examples of such inserts are provided in U.S. Pat. No. 9,038,594, which is incorporated by reference herein.

In a particular embodiment, the volume of the subchamber 64 is at least 0.5% and up to 3.5% of the displacement volume, with the displacement volume being defined as the difference between the maximum and minimum volumes of one combustion chamber 40. In another particular embodiment, the volume of the subchamber 64 corresponds to from about 0.625% to about 1.25% of the displacement volume. The volume of the subchamber 64 may also be defined as a portion of the combustion volume, which is the sum of the minimum chamber volume $V_{min}$ (including the recess 38) and the volume of the subchamber $V_2$ itself. In a particular embodiment the subchamber 64 has a volume corresponding to from 5% to 25% of the combustion volume, i.e. $V_2=5\%$ to 25% of $(V_2+V_{min})$. In another particular embodiment, the subchamber 72 has a volume corresponding to from 10% to 12% of the combustion volume, i.e. $V_2=10\%$ to 12% of $(V_2+V_{min})$.

A main fuel injector 68 is in direct fluid communication with each of the combustion chambers 40 in a successive manner, so as to inject a main quantity of fuel in each of the combustion chambers 40 one after the other. The main fuel injector 68 is located downstream of the intake port 48 and upstream of the pilot subchamber 64 with respect to the direction of rotation R of the rotor 34. The main fuel injector 68 is a direct fuel injector, i.e. it communicates directly with the internal cavity. A main injector opening 70 is defined through the peripheral wall 38 (as shown) or the end wall 54, and extends through the inner surface of the internal cavity. The main fuel injector 68 is received in the main injector opening 70 with its tip 72 adjacent the internal cavity. In a particular embodiment, the main injector opening 70 is configured so as to avoid interfering (e.g. restricting) the fuel flow from the main fuel injector 68 to the internal cavity.

A pilot fuel injector 74 is in fluid communication with the pilot subchamber 64, so as to inject a pilot quantity of fuel in the pilot subchamber 64 for each combustion event of the combustion chambers 40. The pilot fuel injector 74 communicates directly with the pilot subchamber 64, for example by being received within a corresponding pilot injector opening 76 extending through the peripheral wall 38 (as shown) or the end wall 54 and communicating with the pilot subchamber 64, and having the pilot injector tip 78 received within the pilot subchamber 64 or located adjacent the pilot subchamber 64 (as shown). The pilot fuel injector 74 is also in fluid communication with the combustion chambers 40 via the pilot subchamber 64 and the opening(s) 66 defining the communication between the pilot subchamber 64 and the internal cavity.

An ignition source 80 is in heat exchange relationship with the pilot subchamber 64 so as to perform ignition of the fuel injected within the pilot subchamber 64 by the pilot fuel injector 74. In the embodiment shown, the ignition source 80 is a glow plug; the glow plug may for example have a tip 82 received within the pilot subchamber 64 or in a cavity 84 adjacent the pilot subchamber 64 and in fluid communication therewith (as shown). The ignition source 80 may also be in heat exchange relationship with the pilot subchamber 64 without fluidly communicating with the pilot subchamber 64. In a particular embodiment, the material surrounding the pilot subchamber 64 and defining its inner surface includes heat resistant material which becomes sufficiently hot after the engine 12 has started so as to perform ignition of the fuel injected within the pilot subchamber 64 by the pilot fuel injector 74; in this case, the glow plug may be used only at start up and be turned off when the engine 12 has reached its nominal temperature, so that the walls of the pilot subchamber become the ignition source.

Because of the pilot injection and ignition, the main quantity of fuel injected by the main fuel injector 68 can be sized to define a lean fuel-air mixture in the combustion chambers 40. The main and pilot fuel injectors 68, 74 together provide for a stratified fuel-air mixture, defined by a stoichiometric or rich fuel-air mixture near the ignition source 80 as provided by the pilot fuel injector 74, and a lean fuel-air mixture in the combustion chambers 40 as provided by the main fuel injector 68.

When a lean fuel-air mixture is used in the combustion chamber 40, a significant quantity of excess air may remain in the combustion chamber 40 after the combustion process, and be expelled together with the exhaust gases through the exhaust port 50. In order to use this residual quantity of air, an additional fuel injector 86 is provided in fluid communication with each of the combustion chambers 40 in a successive manner, downstream of the pilot subchamber 64 and upstream of the exhaust port 50. This additional fuel injector 86 is characterized herein as an "interburner" injector, since it performs an afterburner function while being located inside the engine 12. The interburner fuel injector 86 injects a supplemental quantity of fuel in each of the combustion chambers 40 one after the other, during the expansion phase of the cycle while the combustion of the main quantity of fuel is still ongoing, so as to use a portion and potentially a total of the remaining excess air in the combustion chamber 40.

The interburner fuel injector 86 is in direct fluid communication with each of the combustion chambers 40 in a successive manner, so as to inject the supplemental quantity of fuel in each of the combustion chambers 40 one after the other. The interburner fuel injector 86 is a direct fuel injector, i.e. it communicates directly with the internal cavity. An interburner injector opening 88 is defined through the peripheral wall 38 (as shown) or the end wall 54, and extends through the inner surface of the internal cavity. The interburner fuel injector 86 is received in the interburner injector opening 88 with its tip 90 adjacent the internal cavity. In a particular embodiment, the interburner injector opening 88 is configured so as to avoid interfering (e.g. restricting) the fuel flow from the interburner fuel injector 86 to the internal cavity.

The position of the interburner fuel injector 86 can be varied between the pilot subchamber 64 and the exhaust port 50, for example along region A shown in FIG. 1. In a particular embodiment, the interburner fuel injector 86 is sufficiently close to the pilot subchamber 64 so that each of the combustion chambers 40 is in simultaneous fluid communication with the pilot subchamber 64 and the interburner fuel injector 86 during a respective portion of a revolution of the rotor 34. In an alternate embodiment, the interburner fuel injector 86 is spaced from the pilot subchamber 64 a distance sufficient to prevent the combustion chambers 40 from simultaneously communicating with the pilot subchamber 64 and the interburner fuel injector 86. If required, cooling can be provided to the nozzle vane of the turbine section 18, particularly, although not exclusively, when the interburner fuel injector 86 is provided in proximity of the exhaust port 50.

Figure 3:
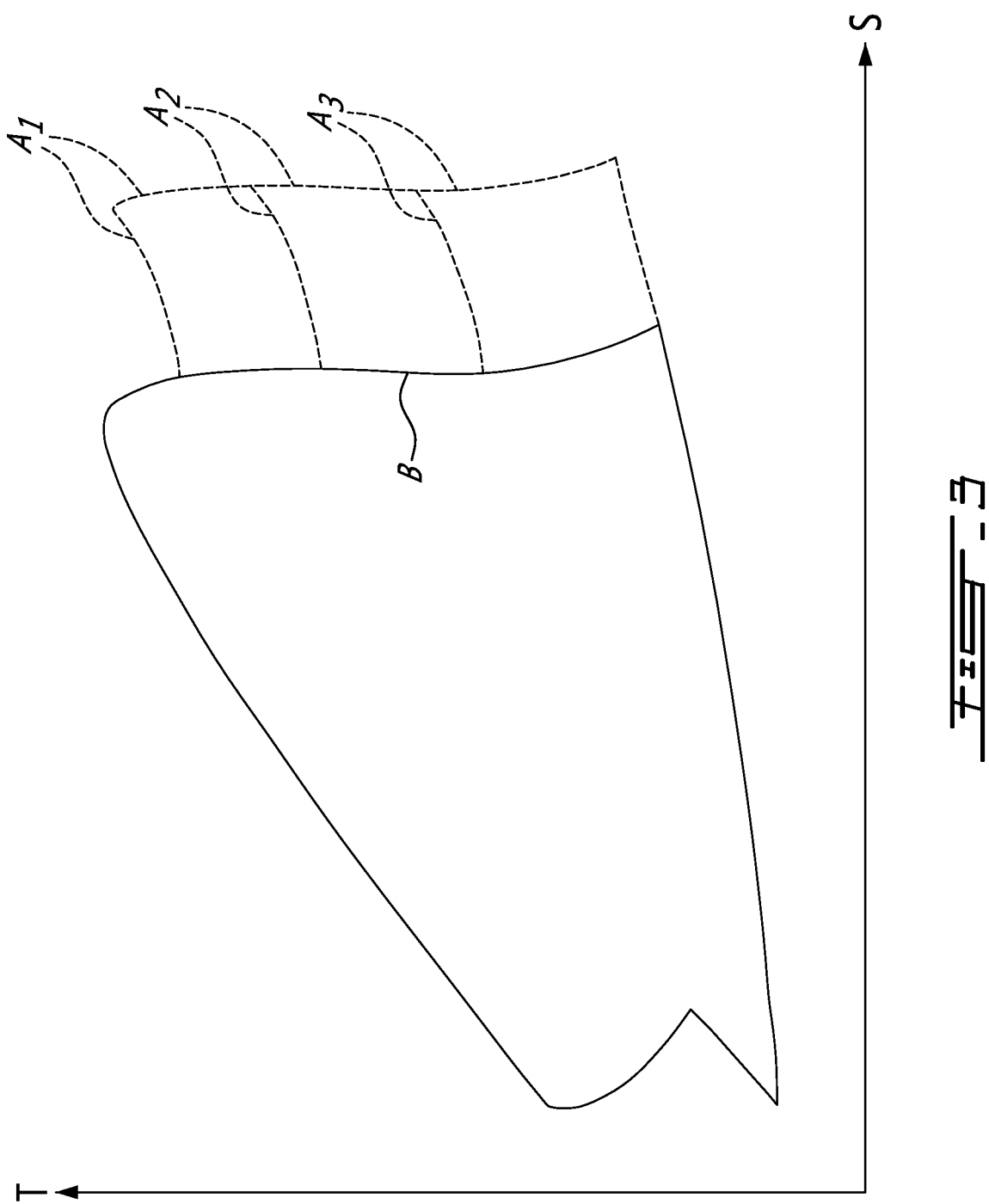
FIG. 3 is a temperature-entropy diagram of a cycle of the engine of FIG. 2 showing variations in the cycle caused by different locations of "interburner" injectors, in accordance with a particular embodiment.

As can be seen from FIG. 3, the impact of the interburner fuel injector 86 on the engine cycle differs based on the location of the interburner fuel injector 86. Examples of modifications of the temperature-entropy diagram caused by the interburner fuel injector 86 is shown for three different interburner fuel injector locations $A_1, A_2, A_3$ (see FIG. 1), as compared to the basic cycle B without the interburner fuel injector 86. It can be seen that the closer the interburner fuel injector is to the pilot subchamber, the higher the temperature of the fuel-air mixture is upon injection of the supplemental quantity of fuel, and the greater the impact on the combustion cycle. In a particular embodiment, having the interburner fuel injector 86 located closer to the pilot subchamber 64 allows to increase the power produced by the engine, as well as decrease the unburned hydrocarbons (HC) since a higher maximum temperature can be reached (see e.g. curve $A_1$ as compared to curve $A_3$), however causes the mechanical and thermal loading on the engine as well as the NOx emissions to increase, as compared to a interburner fuel injector 86 location further away from the pilot subchamber 64. Accordingly, in a particular embodiment, the location of the interburner fuel injector 86 is selected so as to obtain the best possible trade between additional power, combustion efficiency, emissions and additional loading to the rotary portion of the engine.

The main fuel injector 68, the pilot fuel injector 74 and the interburner fuel injector 86 are in fluid communication with the fuel source 14 (FIG. 1); although a common source is shown, it is understood that separate sources could alternately be provided. Accordingly, in a particular embodiment the main fuel injector 68, the pilot fuel injector 74 and the interburner fuel injector 86 inject the fuel, e.g. heavy fuel such as diesel, kerosene, jet fuel, equivalent biofuel, etc. In a particular embodiment the fuel injectors 68, 74, 86 are common rail fuel injectors, fed by the same or by different common rails (not shown).

In a particular embodiment and in use, fuel, e.g. heavy fuel, is combusted in the rotary engine 12 in accordance with the following. Referring back to FIG. 2, the main quantity of fuel is directly injected into the combustion chamber 40 by the main fuel injector 68 so as to form a first fuel-air mixture within the combustion chamber 40, the first fuel mixture being lean. It is understood that the main quantity of fuel can be provided in a single or multiple sprays, and when multiple sprays are used, the multiple sprays can be simultaneous or be sequential.

In the embodiment shown, compressed air from the compressor 20 (FIG. 1) is fed into the combustion chamber 40 through the intake port 48 before injecting the main quantity of fuel to create the first fuel-air mixture. Alternately, ambient air may be fed into the combustion chamber 40 through the intake port 48 to create the first fuel-air mixture.

The first fuel-air mixture is lean and accordingly has an air-fuel equivalence ratio $\lambda$ higher than 1. In a particular embodiment, the air-fuel equivalence ratio $\lambda$ of the first fuel-air mixture formed by the main quantity of fuel is at least 1.6. In a particular embodiment, the air-fuel equivalence ratio $\lambda$ of the first fuel-air mixture formed by the main quantity of fuel is at least 2, for example within the range defined from 2 to 2,3. The air-fuel equivalence ratio $\lambda$ is defined as $$\lambda = \frac{AFR}{AFR_{stoich}}$$

where AFR refers to the air-fuel ratio defined as the ratio between the mass of air and the mass of fuel in the fuel-air mixture, i.e. $AFR = m_{air}/m_{fuel}$. The mass is the mass of all constituents that compose the fuel and air, whether combustible or not. The air-fuel equivalence ratio $\lambda$ is the ratio of actual AFR to AFR at stoichiometry for a given mixture; accordingly, at stoichiometry $\lambda=1.0$. For lean fuel-air mixture the air-fuel equivalence ratio $\lambda$ is greater than 1 with leaner fuel-air mixtures having a greater value of $\lambda$, while rich fuel-air mixtures have an air-fuel equivalence ratio $\lambda$ lower than 1 with richer fuel-air mixtures having a smaller value of $\lambda$.

In a particular embodiment, the first fuel-air mixture formed within the combustion chamber by the injection of the main quantity of fuel has a fuel-air equivalence ratio $\phi$ lower than 1, for example within a range defined from 0.1 to 0.6. The fuel-air equivalence ratio $\phi$ is defined as the ratio between the actual fuel to oxidizer ratio and the fuel to oxidizer ratio at stoichiometry:

$$\phi = \frac{\text{fuel to oxidizer ratio}}{(\text{fuel to oxidizer ratio})_{stoich}}$$

Lean fuel-air mixtures have a fuel-air equivalence ratio $\phi$ smaller than 1 with leaner fuel-air mixtures having a smaller value of $\phi$, while rich fuel-air mixture have a fuel-air equivalence ratio $\phi$ greater than 1 with richer fuel-air mixtures having a greater value of $\phi$; at stoichiometry, $\phi=1$. The fuel-air equivalence ratio $\phi$ and the air-fuel equivalence ratio $\lambda$ are related in accordance with the following:

$$\phi = \frac{1}{\lambda}$$

In order to combust the fuel in the rotary engine 12, the pilot quantity of fuel is injected into the pilot subchamber 64 by the pilot fuel injector 74 to form a second fuel-air mixture within the pilot subchamber 64. It is understood that the pilot quantity of fuel can be provided in a single or multiple sprays, and when multiple sprays are used, the multiple sprays can be simultaneous or be sequential. This second fuel-air mixture has an air-fuel equivalence ratio λ which is smaller than the air-fuel equivalence ratio λ of the combustion chamber 40, i.e. the fuel-air mixture is richer within the pilot subchamber 64 and leaner within the combustion chamber 40. In a particular embodiment, the fuel-air mixture within the pilot subchamber 64 is close to stoichiometry; in a particular embodiment, the air-fuel equivalence ratio λ of the fuel-air mixture within the pilot subchamber 64 is at most 1.

The stoichiometric or rich fuel-air mixture within the pilot subchamber 64 is then ignited. The fuel-air mixture within the pilot subchamber 64 may be ignited for example by the glow plug 80 and/or the hot subchamber wall. The ignited fuel-air mixture is then used to ignite the first fuel-air mixture in the combustion chamber 40; the ignited pilot fuel-air mixture flows from the pilot subchamber 64 through the opening(s) 66 and forms a flame expelled into the combustion chamber 40 and allowing for ignition of the lean fuel-air mixture of the combustion chamber 40.

The supplemental quantity of fuel is then injected by the interburner fuel injector 86 directly into the combustion chamber 40 after ignition of the first fuel-air mixture, e.g. during combustion of the first fuel-air mixture. It is understood that the supplemental quantity of fuel can be provided in a single or multiple sprays, and when multiple sprays are used, the multiple sprays can be simultaneous or be sequential. Since combustion is still active in the combustion chamber 40, ignition of the supplemental quantity of fuel injected by the interburner fuel injector 86 is practically instantaneous. The supplemental quantity of fuel is injected upstream of the exhaust port 50 with respect to the direction of rotation R of the rotor. As mentioned above, depending on the location of the interburner fuel injector 86, the supplemental quantity of fuel may be injected while the combustion chamber 40 communicates with the pilot subchamber 64, or after the communication between the combustion chamber 40 and the pilot subchamber 64 is closed.

In the embodiment shown and referring to FIG. 1, the combustion exhaust is fed from the exhaust port 50 to the turbine section 18, and power from the turbine shaft 19 is compounded with power from the engine shaft 16. Alternately, the combustion may be fed from the exhaust port 50 to a turbine without compounding power between the engine and turbine, or may be fed elsewhere, e.g. to ambient air in the environment around the engine assembly 10.

Figure 4:
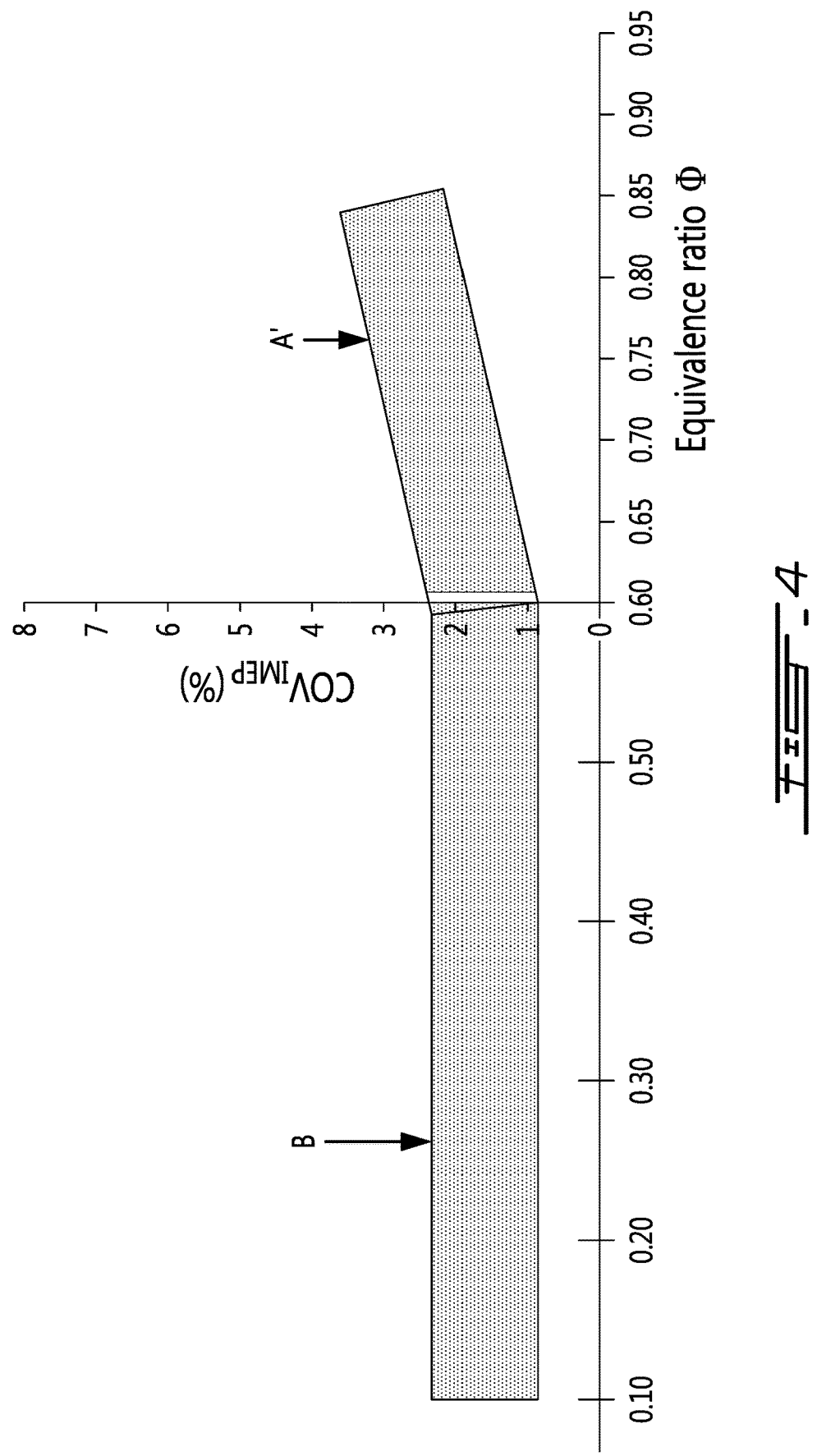
FIG. 4 is a diagram of a coefficient of variance of the indicated mean effective pressure $COV_{IMEP}$ as a function of the fuel-air equivalence ratio $\phi$ for the engine of FIG. 2 with and without the supplemental quantity of fuel provided by the interburner fuel injector, in accordance with a particular embodiment.

Referring to FIG. 4, in a particular embodiment the supplemental quantity of fuel injected into the combustion chamber 40 increases the fuel-air equivalence ratio ϕ in the combustion chamber 40 (and accordingly, reduces the air-fuel equivalence ratio λ); FIG. 4 shows the coefficient of variance of the indicated mean effective pressure $COV_{IMEP}$ as a function of the fuel-air equivalence ratio ϕ of the fuel-air mixture in the combustion chamber 40 without the supplemental fuel injection (B) and with the supplemental fuel injection (A'). In the embodiment shown, the fuel-air equivalence ratio ϕ within the combustion chamber 40 increases from a value within a range defined from 0.1 to 0.6 to a value of at least 0.6, or to a value within a range from 0.6 to 0.85, when the supplemental quantity of fuel is injected. The supplemental quantity of fuel injected by the interburner fuel injector 86 thus reduces the air-fuel equivalence ratio λ within the combustion chamber, for example from a value within a range defined from 2 to 2.3 (fuel-air equivalence ratio ϕ from 0.43 to 0.5), to a value of at most 1.67 (fuel-air equivalence ratio ϕ of at least 0.6), or to a value within a range defined from 1.18 to 1.67 (fuel-air equivalence ratio ϕ from 0.6 to 0.85). In a particular embodiment, this allows to provide more power within the same size engine and thus increase power to weight capability.

In a particular embodiment, the supplemental quantity of fuel injected by the interburner fuel injector 86 also slightly increases the coefficient of variance of the indicated mean effective pressure $COV_{IMEP}$, and accordingly slightly increases the variability of the cycle and thus slightly decreases the stability of the combustion process, while still allowing the stability to remain within acceptable limits. In a particular embodiment, the coefficient of variance of the indicated mean effective pressure $COV_{IMEP}$ is within a range defined from 0 to 3% (e.g. from 1% to 2.25% as shown) for fuel-air equivalence ratios ϕ from 0.1 to 0.6 in the combustion chamber before the addition of the interburner fuel injector, and the addition of the interburner fuel injector increases the coefficient of variance of the indicated mean effective pressure $COV_{IMEP}$ depending on the change of fuel-air equivalence ratios ϕ in the combustion chamber caused by the injection of the supplemental quantity of fuel; for example, at an fuel-air equivalence ratio ϕ of about 0.85, the indicated mean effective pressure $COV_{IMEP}$ increases within a range defined from 2% to 5% (e.g. from 2% to 3.5% as shown). Other values are also possible.

In a particular embodiment, the main quantity of fuel injected by the main fuel injector 68 is greater than the supplemental quantity of fuel injected by the interburner fuel injector 86, and the supplemental quantity of fuel injected by the interburner fuel injector 86 is greater than the pilot quantity of fuel injected by the pilot fuel injector 74. For example, in a particular embodiment, the sum of the pilot quantity, main quantity and supplemental quantity injected for a same combustion event defines a total quantity of fuel, which is distributed in accordance with the following: the pilot quantity injected by the pilot fuel injector 74 corresponds to 2% to 10% of the total quantity of fuel, the supplemental quantity injected by the interburner fuel injector 86 corresponds to 10 to 40% of the total quantity of fuel, and the main quantity of fuel injected by the main fuel injector 68 corresponds to at least 50% of the total quantity of fuel, e.g. the remaining 50% to 88% of the total quantity of fuel. In a particular embodiment, the pilot quantity injected by the pilot fuel injector 74 corresponds about 5% of the total quantity of fuel, the supplemental quantity injected by the interburner fuel injector 86 corresponds to about 20% of the total quantity of fuel, and the main quantity of fuel injected by the main fuel injector 68 corresponds to about 75% of the total quantity of fuel. Other values are also possible.

In a particular embodiment, the supplemental quantity injected by the interburner fuel injector 86 allows to inject additional heat in the system at lower than peak pressure, which minimizes the additional mechanical loading created by the additional heat. In a particular embodiment, the supplemental quantity injected by the interburner fuel injector 86 corresponds to about 10% of the total quantity of fuel, and this produces an increase in the power generated by the engine of about 20% with minimal mechanical loading increase. Accordingly, in a particular embodiment the interburner fuel injector 86 significantly improves both the power density and specific fuel consumption of the engine.

The above description is meant to be exemplary only, and one skilled in the art will recognize that changes may be made to the embodiments described without departing from the scope of the invention disclosed. Modifications which fall within the scope of the present invention will be apparent to those skilled in the art, in light of a review of this disclosure, and such modifications are intended to fall within the appended claims.

The invention claimed is:

1. A rotary engine comprising:
    a rotor sealingly received within an internal cavity of a housing to define a plurality of combustion chambers having a variable volume;
    an intake port and an exhaust port defined through the housing and in fluid communication with each of the combustion chambers in a successive manner;
    a pilot subchamber stationary relative to the housing and in fluid communication with each of the combustion chambers in a successive manner, a volume of the pilot subchamber being at least 0.5% and at most 3.5% of a displacement volume defined as a difference between maximum and minimum volumes of one of the combustion chambers;
    a main fuel injector in direct fluid communication with each of the combustion chambers in a successive manner, the main fuel injector being located downstream of the intake port and upstream of the pilot subchamber with respect to a direction of rotation of the rotor;
    a pilot fuel injector in fluid communication with the pilot subchamber;
    an ignition source in heat exchange relationship with the pilot subchamber; and
    an interburner fuel injector in direct fluid communication with each of the combustion chambers in a successive manner, the interburner fuel injector being located downstream of the pilot subchamber and upstream of the exhaust port.

2. The rotary engine as defined in claim 1, further comprising a source of heavy fuel in fluid communication with the main fuel injector, the pilot fuel injector and the interburner fuel injector.

3. The rotary engine as defined in claim 1, wherein each of the combustion chamber is in simultaneous fluid communication with the pilot subchamber and the interburner fuel injector during a respective portion of a revolution of the rotor.

4. The rotary engine as defined in claim 1, wherein the interburner fuel injector is spaced from the pilot subchamber a distance sufficient to prevent the combustion chambers from simultaneously communicating with the pilot subchamber and the interburner fuel injector.

5. The rotary engine as defined in claim 1, wherein the ignition source is a glow plug.

6. The rotary engine as defined in claim 1, wherein the rotary engine is a Wankel engine, the internal cavity having a profile defining two lobes, the rotor having three circumferentially-spaced apex portions in sealing engagement with a peripheral wall of the housing and separating the combustion chambers.

7. A compound engine assembly including the rotary engine as defined in claim 1, a compressor in fluid communication with the intake port of the rotary engine, and a turbine in fluid communication with the exhaust port of the rotary engine, the turbine having a turbine shaft drivingly engaged with an engine shaft drivingly engaged to the rotor.

8. The rotary engine as defined in claim 1, wherein the pilot subchamber has a circular cross-section.

9. The rotary engine as defined in claim 1, wherein the pilot subchamber is in fluid flow communication each of the combustion chambers in a successive manner via at least one opening, the at least one opening defining a restriction.

10. The rotary engine as defined in claim 1, wherein the pilot subchamber has a shape forming a reduced cross-section adjacent an opening connecting the pilot subchamber to each of the combustion chambers in a successive manner.

11. The rotary engine as defined in claim 1, wherein the pilot subchamber is defined by an insert received within the housing.

12. The rotary engine as defined in claim 11, wherein the insert is made of a material having a greater heat resistance than that of the housing.

13. A rotary engine comprising:
    a rotor sealingly received within an internal cavity of a housing to define a plurality of combustion chambers having a variable volume;
    an intake port and an exhaust port defined through the housing and in fluid communication with each of the combustion chambers in a successive manner;
    a pilot subchamber stationary relative to the housing and in fluid communication with each of the combustion chambers in a successive manner, a volume of the pilot subchamber being from 5% to 25% of a combustion volume defined as a sum of a minimum volume of one of the combustion chambers and a volume of the pilot subchamber;
    a main fuel injector in direct fluid communication with each of the combustion chambers in a successive manner, the main fuel injector being located downstream of the intake port and upstream of the pilot subchamber with respect to a direction of rotation of the rotor;
    a pilot fuel injector in fluid communication with the pilot subchamber;
    an ignition source in heat exchange relationship with the pilot subchamber; and
    an interburner fuel injector in direct fluid communication with each of the combustion chambers in a successive manner, the interburner fuel injector being located downstream of the pilot subchamber and upstream of the exhaust port.

14. The rotary engine as defined in claim 13, further comprising a source of heavy fuel in fluid communication with the main fuel injector, the pilot fuel injector and the interburner fuel injector.

15. The rotary engine as defined in claim 13, wherein each of the combustion chamber is in simultaneous fluid communication with the pilot subchamber and the interburner fuel injector during a respective portion of a revolution of the rotor.

16. The rotary engine as defined in claim 13, wherein the interburner fuel injector is spaced from the pilot subchamber a distance sufficient to prevent the combustion chambers from simultaneously communicating with the pilot subchamber and the interburner fuel injector.

17. The rotary engine as defined in claim 13, wherein the ignition source is a glow plug.

18. The rotary engine as defined in claim 13, wherein the rotary engine is a Wankel engine, the internal cavity having a profile defining two lobes, the rotor having three circumferentially-spaced apex portions in sealing engagement with a peripheral wall of the housing and separating the combustion chambers.

19. The rotary engine as defined in claim 13, wherein the pilot subchamber has a circular cross-section.

* * * * *